Figure 1:
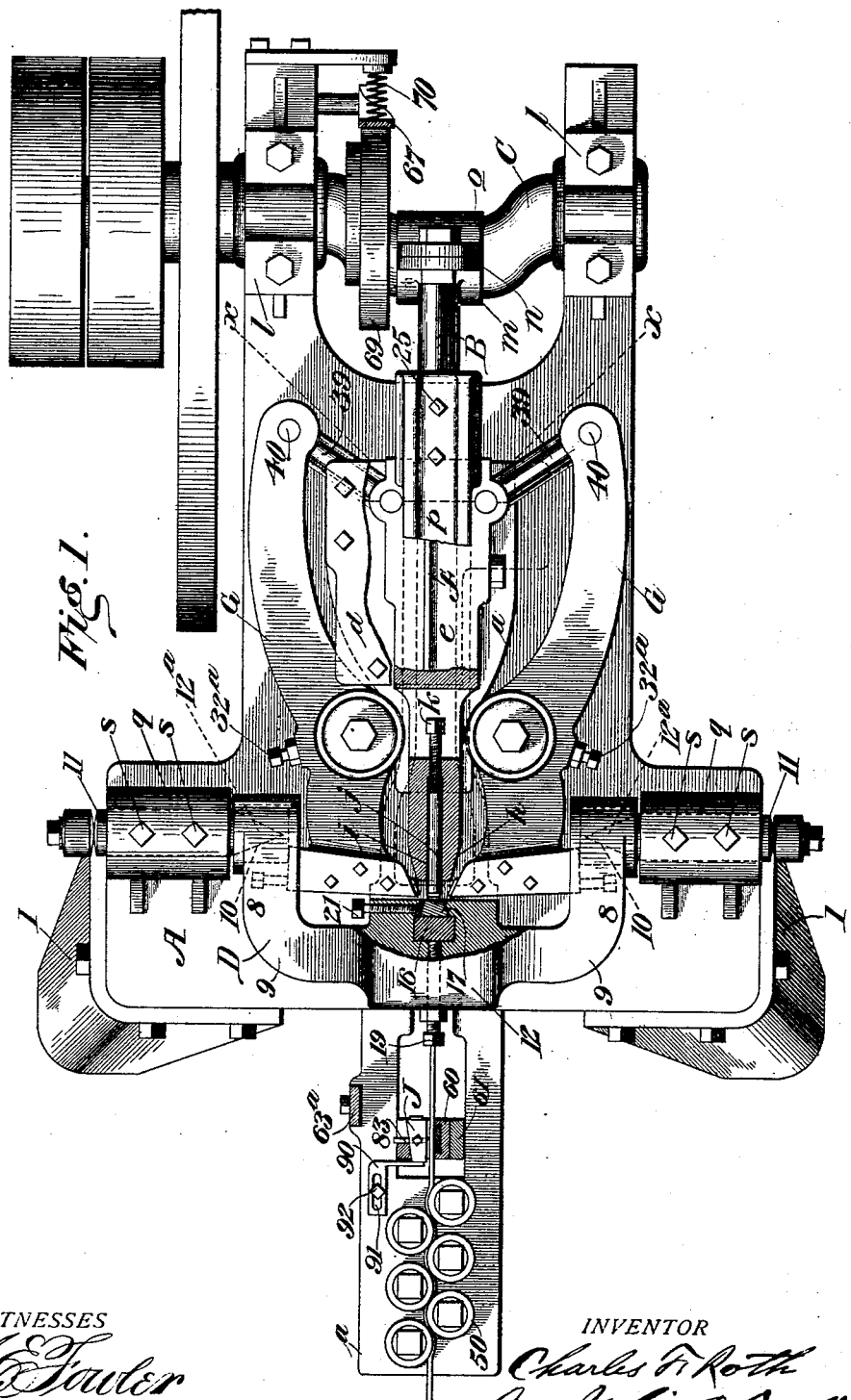

No. 677,278. Patented June 25, 1901.
C. F. ROTH.
WIRE NAIL MACHINE.
(Application filed Feb. 28, 1901.)
(No Model.) 5 Sheets—Sheet 1.

WITNESSES
INVENTOR
Charles F. Roth
By Julius C. Dowell
His Attorney

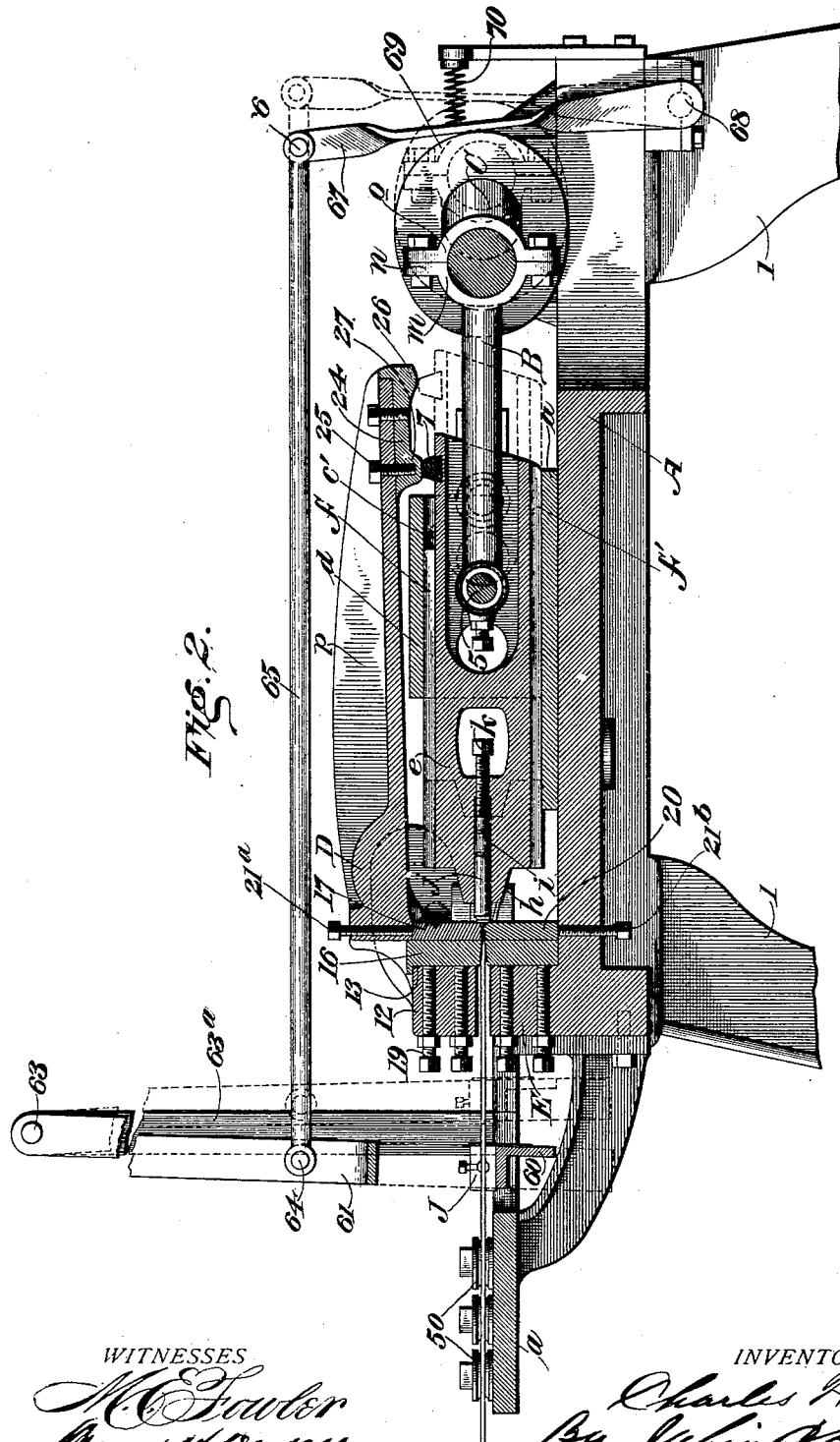

No. 677,278. Patented June 25, 1901.
C. F. ROTH.
WIRE NAIL MACHINE.
(Application filed Feb. 28, 1901.)
(No Model.) 5 Sheets—Sheet 3.
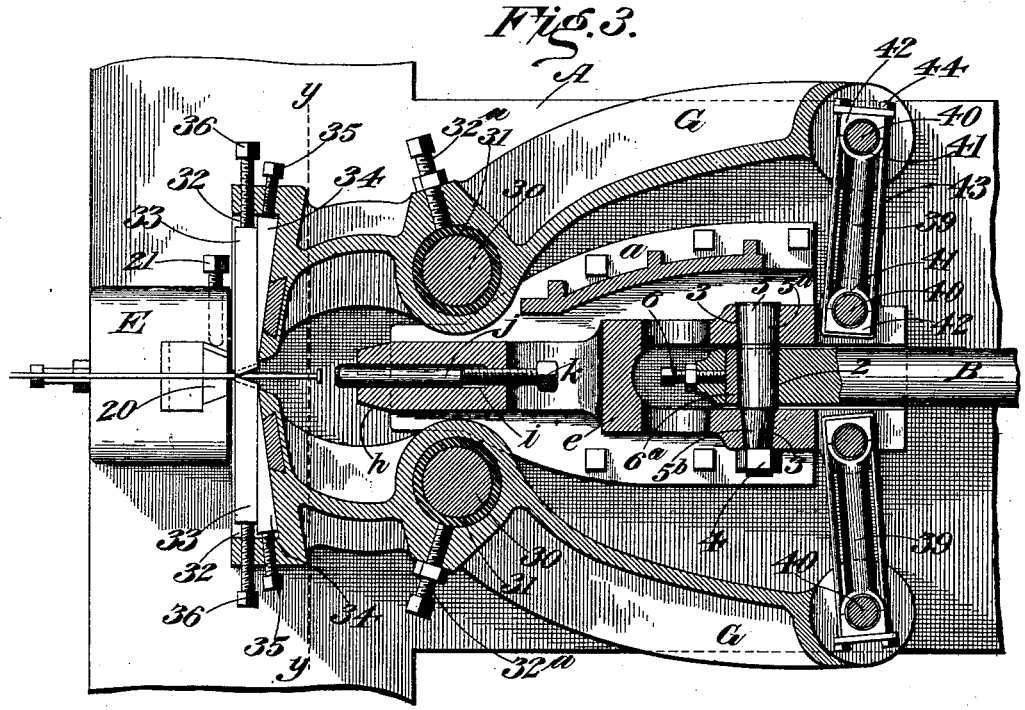
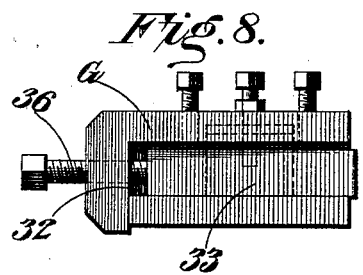
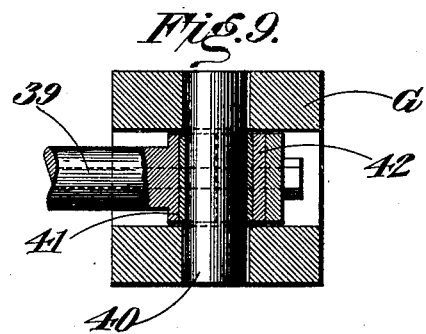
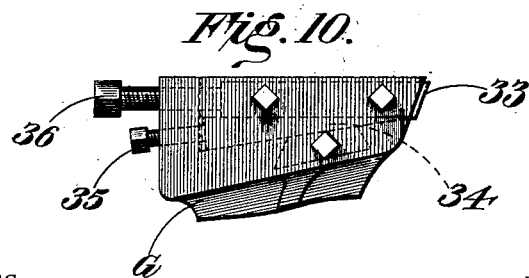
WITNESSES
INVENTOR

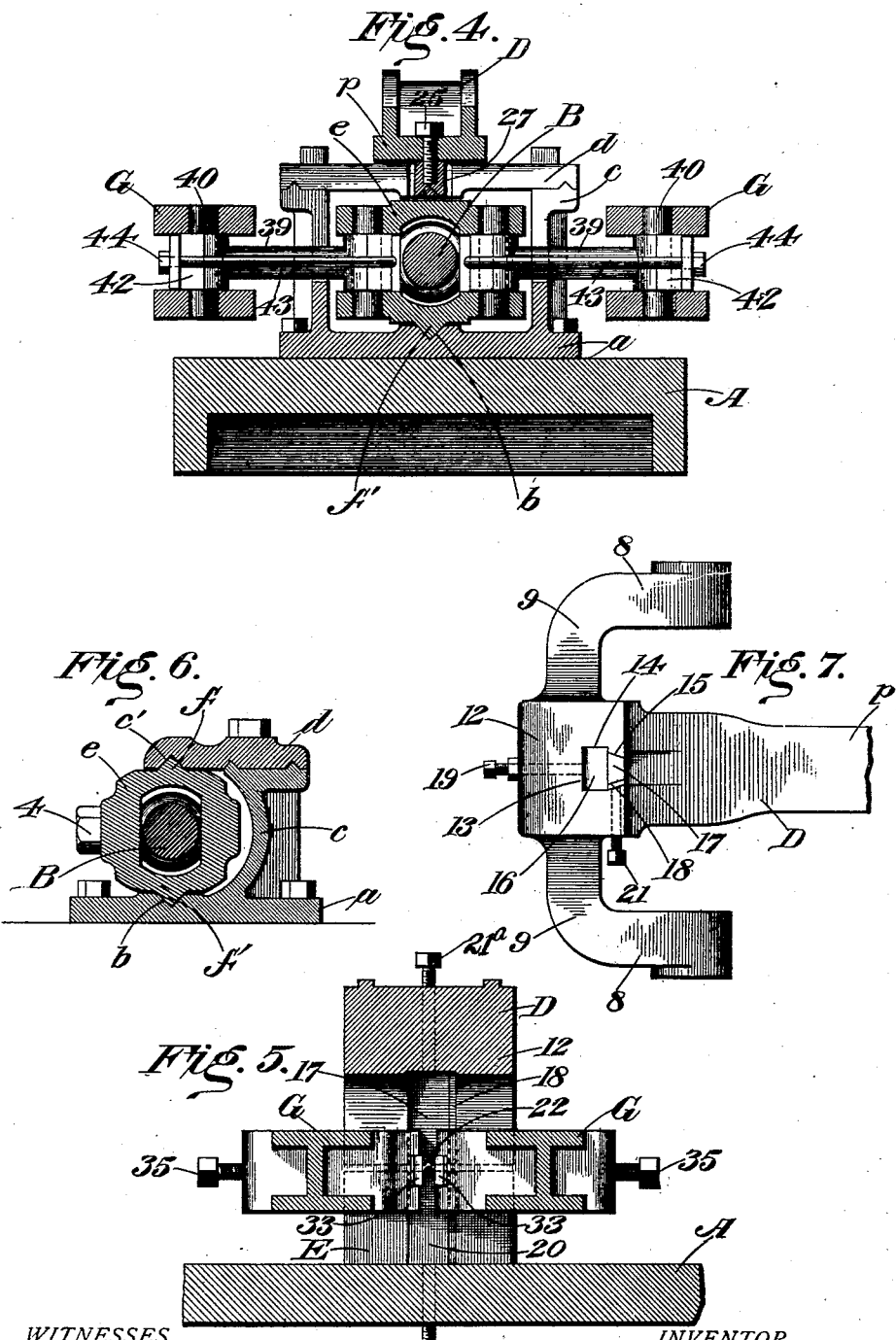

No. 677,278. Patented June 25, 1901.
C. F. ROTH.
WIRE NAIL MACHINE.
(Application filed Feb. 28, 1901.)
(No Model.) 5 Sheets—Sheet 5.
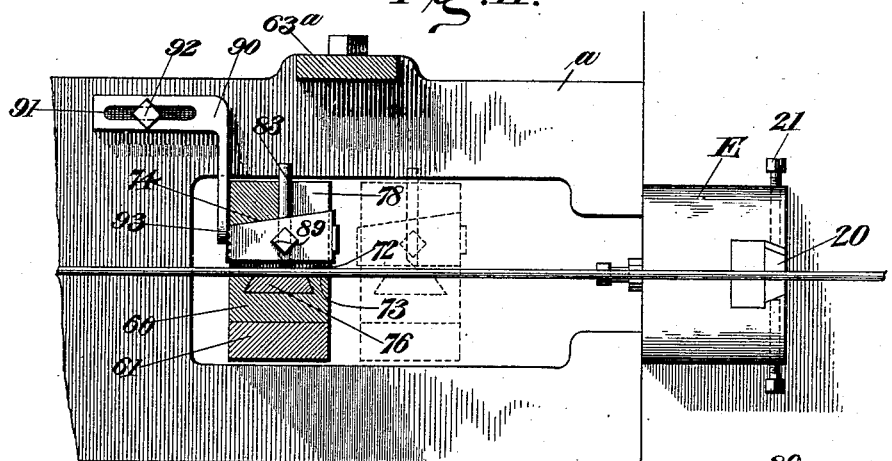
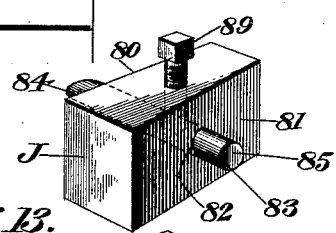
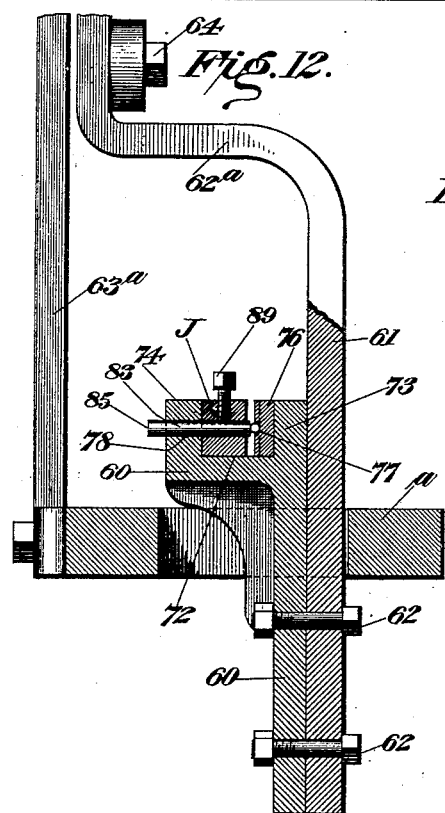
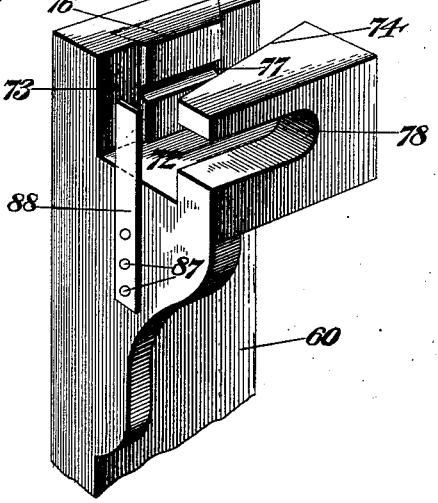
WITNESSES
INVENTOR
Charles F. Roth
By
His Attorney

UNITED STATES PATENT OFFICE.

CHARLES F. ROTH, OF IRONTON, OHIO.

WIRE-NAIL MACHINE.

SPECIFICATION forming part of Letters Patent No. 677,278, dated June 25, 1901.

Application filed February 28, 1901. Serial No. 49,315. (No model.)

*To all whom it may concern:*

Be it known that I, CHARLES F. ROTH, a citizen of the United States, residing at Ironton, in the county of Lawrence and State of Ohio, have invented certain new and useful Improvements in Wire-Nail Machines; and I do hereby declare the following to be a full, clear, and exact description of the invention, such as will enable others skilled in the art to which it appertains to make and use the same.

This invention relates to machines for making wire nails; and it consists, substantially, in the improvements hereinafter more particularly described, and pointed out in the claims.

In many former instances of this class of machines the construction and arrangement of parts resorted to have been such as to render the machine exceedingly complicated, due to the great number of elements or parts constituting the several mechanisms thereof, and consequently the cost of the machine has been correspondingly great. In other former instances while the elements or parts constituting each of the several mechanisms of the machine are perhaps comparatively few in number still a great many disadvantages have been encountered therewith, due to irregular and ineffective coöperation between such mechanisms, particularly as regards the actuating devices therefor, by which each mechanism is thrown into and out of operation at the proper time. Moreover, in many former instances each of the separate mechanisms of the machine is in itself frequently ineffective and unreliable for its purpose, besides being very slow in action, and which of course greatly reduces the total output of the machine in a given time. It should also be remarked, perhaps, that in many former instances the gripping devices for the wire are frequently inadequate to hold the latter against the pressure of the heading or upsetting devices for the nail, and which results in imperfect heading of the nails and very frequently renders the entire machine inoperative.

One object of the present invention is to overcome all of the above-mentioned disadvantages and objections and to provide a machine of this character in which the several mechanisms thereof coöperate in unison and at the proper time and also to greatly reduce the number of parts, as well as the cost of construction of the machine.

A further object is to provide means whereby the heading or upsetting of the nails is effected in the most perfect and rapid manner and also to provide means whereby the feed of the wire is effected at the proper time and to the proper extent to supply the lengths for the nails.

A further object is to provide means for positively holding the wire against slipping while operated upon by the heading devices or mechanism and also to provide means for preventing the wire from turning or wabbling at the time of the operation of the cutting and shaping devices for the nail.

A still further object is to improve and simplify the construction and arrangement of the parts constituting the several mechanisms of the machine and to also greatly increase the output of the machine as compared with many other similar machines now in use.

The above and additional objects I attain by the means illustrated in the accompanying drawings, in which—

Figure 1 is a top or plan view of my improved machine, the same being partly in section and partly broken away to more clearly indicate the construction and arrangement of the different parts, said view indicating the wire as fed forward and the heading devices in position just in the act of heading the nail. Fig. 2 is a longitudinal sectional view, in part elevation, the same indicating more particularly the construction and operation of the mechanism for effecting the holding or detention of the wire while the nail is being headed. Fig. 3 is an enlarged part sectional view, in horizontal plan and partly broken away at one end, said view indicating the cutting and shaping devices for the nail in position for severing or cutting the wire the proper length for a nail. Fig. 4 is a transverse sectional view taken on the line $x\ x$ of Fig. 1 looking to the left. Fig. 5 is a similar view taken on the line $y\ y$ of Fig. 3, also looking to the left. Fig. 6 is a sectional view in detail to more clearly indicate the means by which the heading devices are guided back and forth in their movements longitudinally of the machine. Fig. 7 is an enlarged view in detail of the under side of the forward end of the double-acting rocking arm for holding or detaining the wire in position both at the time the nail is headed and cut off and pointed. Figs. 8, 9, and 10 are enlarged views in detail of certain parts of the machine. Fig. 11 is an enlarged view, in part horizontal sectional plan, representing more clearly the construction and mode of operation of the feed mechanism for the wire. Fig. 12 is an enlarged vertical transverse sectional view of said feeding mechanism looking to the right in Figs. 1 and 2; and Fig. 13 is a reverse perspective view of each part of the feed device proper, showing the construction thereof and manner in which the parts are arranged together.

Before proceeding with a more detailed description it may be stated that in the construction of my improved wire-nail machine I employ suitable mechanism for gripping the end of the wire and securely holding the same in place to be headed, said mechanism being actuated immediately preceding the forward motion of the heading devices, which are moved up against the projecting end of the wire, so as to upset the latter in the ordinary way. Immediately the upsetting or heading of the end of the wire has been effected the heading devices recede or move backwardly, and simultaneously with such movement the said gripping mechanism is momentarily lifted or released from the end of the wire, and the feeding devices then operate at this time to move or feed the wire the extent of length of the nail, whereupon the said gripping devices are again actuated to descend lightly upon the wire, while at the same time my improved mechanism for cutting off the nail and pointing or shaping the end thereof is operated. Immediately the nail is cut off or severed from the wire the knives or cutters are moved apart or separated, and simultaneously with this movement or operation the gripping mechanism is again actuated to be lifted from the wire, so that a space is left for the next succeeding forward movement of the heading devices, which at this time now move up again to upset the projecting end of the wire, as before. The parts constituting each set of mechanism, as well as the several mechanisms themselves, are so constructed that they all operate in unison and with perfect accuracy, and the operations just described are repeated over and over again in rapid succession in the formation of the nails. Everything depends upon the easy and uniform action of the different parts, and which, it will be seen, I have secured by the construction of devices I employ. In this class of machines it is particularly essential and desirable that the feeding mechanism for the wire shall operate with perfect accuracy and effectiveness, and this I also secure by means of an intermittently-swinging arm operated from the main shaft, and to which arm is attached or secured suitable means, upon which the feed mechanism proper is mounted. This mechanism comprises in the main a longitudinally-reciprocating guide, through which the wire passes, the inward and outward movements of said guide taking place upon the said wire. The said guide is formed or provided with a suitable recess, one side of which is straight and the other side beveled or inclined, and working in said recess and having a limited longitudinal reciprocating movement therein independently of said guide is a wedge or block through which passes an adjustable and preferably chisel-shaped device for biting or taking into the side of the wire slightly or with sufficient frictional engagement to operate to pull the wire forward a length or distance about equaling the extent or forward motion of the said guide, and which also is the length of the nail. Said wedge or block operates inwardly against the action of a spring, which always exerts pressure thereon, while located on the machine in suitable position is an abutment or stop with which the smaller or tapered end of the wedge comes into contact on the outward movement of the guide. The construction and arrangement of the said feed mechanism can of course be varied from that herein shown, and it may be added that the operation is substantially as follows: The spring normally presses the wedge outwardly with respect to the feed-guide, and while the wedge is in this position no substantial hold is taken by the chisel upon the wire. When the feed-guide is carried outwardly, both the block or wedge, and consequently the chisel and actuating-spring, are all carried therewith, similarly as they are on the return or inward movement of said slide, but on the outward movement of the guide the chisel-shaped device simply moves along the side of the wire freely, the width of the recess in the guide being sufficient to allow the wedge a limited sidewise bodily movement, so it will be seen that the position of the wire remains unaltered on the said outward movement of the said feed-guide. Now as soon as the outer or smaller end of the movable block or wedge comes into contact with the stop or abutment on the machine the said block or wedge is arrested in its outward movement momentarily, while the guide continues to move outwardly the full extent of its limit. By this action the straight side of the wedge is necessarily carried farther away from the straight side of the recess in the guide, and consequently as soon as the guide again moves inwardly the effect of the actuating-spring is to cause the chisel to bite or take into the side of the wire, as explained. Now, again, on the next inward movement of the slide the wire is moved or fed into the machine to the proper extent and the heading thereof and the severance and pointing of the nail effected. By means of my improved feed device the engagement of the wire by the chisel device takes place quickly and at the proper point of the wire, and there is absolutely no liability to slipping of the feed devices, and consequently the feeding of the proper length of wire is always positively assured.

Specific reference being had to the accompanying drawings, A represents a suitable table or platform elevated to a proper height upon supporting-legs 1, and mounted upon said table or platform is a suitable bed-plate $a$, provided in its upper side or surface with a central longitudinal groove $b$, that is preferably V-shaped, but which, as is evident, could be of any other desired shape. Mounted above the table or platform for a suitable height and suitably supported at $c$ is a plate $d$, having on its under side a similar central longitudinal V-shaped groove $c'$, which is directly in vertical line with said groove $b$ in the bed-plate $a$. Located or confined between the said bed-plate $a$ and upper plate $d$ is a longitudinally-reciprocating yoke or frame $e$, provided on its upper side with a V-shaped rib or tongue $f$ and on its under side with a similar V-shaped rib or tongue $f'$, said ribs or tongues fitting and working within the V-shaped grooves of the upper plate $d$ and the bed-plate $a$, respectively. By this construction the said longitudinally-reciprocating yoke or frame $e$ is evenly and truly guided back and forth when operated, as hereinafter described. Of course it will be understood that other means for thus guiding the said yoke or frame could be resorted to, if desired. Said yoke or frame $e$ is preferably skeleton-like in form for the purpose of lightness and so as to enable a wrench or other suitable device to be inserted therein from the sides to adjust the connections between the yoke or frame and its operating devices, as well as the heading-tool, &c. Preferably the forward end of said yoke or frame is tapering at $h$, and through said tapered end a suitable longitudinal opening $i$ is formed, in which is inserted the heading-tool $j$ for the nails. Said heading-tool is adjustable longitudinally of the machine by means of an adjusting device or screw $k$ and is also provided at its forward end with a suitable head for effecting the upsetting of the end of the wire by pressure exerted on the forward movement of the longitudinally-reciprocating yoke or frame $e$ referred to. Of course I am not limited to the particular construction and arrangement of either of the said parts or elements just referred to. Suitably connecting with the rearward end of the said frame or yoke $e$ is the forward end of a pitman B, the rearward end of which is in movable connection with a main crank-shaft C, having its bearings in posts or pillars $l\,l$, mounted in suitable positions upon the table or platform A. The said rearward end of the said pitman is formed with a half-bearing $m$, partially embracing the cranked portion of the said main crank-shaft C, and said half-bearing is provided with suitable flanges $n$. Fitted to said half-bearing $m$ by means of fastening bolts and nuts is a similar half-bearing $o$, embracing the remaining portion or side of the said cranked portion of the said main shaft, and thus is the said pitman B connected with said crank-shaft C, so as to be operated by the latter to be reciprocated. The connection between the forward end of said pitman and the rearward end of the yoke or frame $e$ is such as to permit the slight necessary rising-and-falling movement of the pitman in its reciprocations from the crank-shaft and the preferred form of such connections being shown more clearly in Fig. 3. In said figure the forward end of said pitman B enters the rearward end of said yoke or frame $e$ for a suitable distance, and near its end the said pitman is formed with a transverse opening 2, which registers at either end with a similar opening 3, formed in the adjacent or corresponding side of the said reciprocating yoke or frame $e$. Passing through said openings and secured by means of a nut 4 is a journal-pin 5, which, as shown, is preferably slightly conical or tapering at $5^a$ and $5^b$ to fit the correspondingly-shaped walls of the openings 3 referred to, while at its central portion said pin is straight. In this way the desired connection between the pitman and yoke is attained, and it will be observed that a set-screw 6 is inserted in the end of the pitman, so as to bear upon the bearing-box $6^a$ for the journal-pin 5, by which to take up wear and lost motion.

Formed with or secured in place upon the upper surface of the longitudinally-reciprocating frame or yoke $e$ is a centrally-arranged cam-lug 7, which is so disposed as to operate a double-acting dog or rocker-arm D, the arm $p$ of which extends rearwardly of the machine, about centrally of the same transversely. At its forward end the said double-acting dog or rocker-arm D is formed with branches 8, extending to either side thereof, and which gives to said dog or rocker-arm at such end substantially a T shape. Said lateral branches 8 of the said dog or rocker-arm D are, however, curved rearwardly of the machine, as shown at 9 9, Fig. 1, and at the extremity of each of said branches is formed a transverse opening or bearing 10, preferably tapering or conical in shape, and through which passes the end of a journal or pin 11, each of said pins being received or seated within a suitable transverse opening formed or provided at or near the upper end of a bearing post or pillar $q$. Said pillars are mounted upon the platform A, to either side thereof at the forward end, and they are each provided with set-screws $s$, permitting the proper adjustments of the said journal-pins 11. Each of the latter, as will be observed at $12^a$, is made tapered or conical to correspond to the shape of the openings 10 in the ends of the lateral branches of the dog or rocker-arm D, and it will thus be seen that the arm $p$ of the latter-named device is free to rise and fall upon the bearings provided by the conical ends of said journal-pins 11. This is the form of rocking bearings which I preferably employ in some instances; but it will be understood that I do not limit myself thereto in practice. The said double-acting dog or rocker-arm D constitutes the means I employ for holding the fed-in portion of the wire rigidly in position while the end thereof is being headed and also for holding said portion of the wire in position as the nail is being severed therefrom and shaped or pointed at the same time. As will appear more fully from the construction more specifically hereinafter explained, the construction and operation of the parts or mechanisms is such that the gripping pressure exerted upon the wire by the said dog at the time the wire is being headed or upset is sufficient to prevent any retrograde or backward slipping of said wire under the pressure exerted against the end thereof by the heading or upsetting mechanism while the pressure exerted upon the said wire by said dog at the time the wire is being severed and pointed is only sufficient to prevent the wire from turning or bending to one side or the other by the force of the cutting and shaping dies. In this way every provision is made for the rapid manufacture of wire nails, which are not misshapen or distorted in any manner by the action of the machinery thereon. The nails as made are dropped into any suitable receptacle therefor, and, if desired, any suitable form of ejecting mechanism may be employed to insure the proper passing or dropping of the finished nails from the machine. At its forward end and beyond the journal-bearings therefor the said dog or rocking arm D is enlarged at 12, and on the inner side or face of said enlarged portion (see Fig. 7) is formed a vertical channel or groove 13, the sides of which are partially flat or rectangular at 14 and for the remainder are beveled or tapered, as shown at 15. Located in the squared portion of said channel or groove 13 is a hard-metal supporting and adjusting plate 16 for the inner face of a die 17, beveled on its sides and located between the beveled side portions of the groove. The said die is of less width than the space between the tapered or beveled side walls of the groove, and located between one of said latter walls and the adjacent side of the die is a similar supporting and adjusting plate 18. Extending through openings formed in the forward end of the dog or rocker-arm are suitable adjusting-screws 19 for said die, and which screws bear against plate 16, while inserted in similar openings at the side of the die are also adjusting-screws 21, which bear against the said side plate 18. In this way it will be seen that the said die 17 is readily inserted in its proper place and again removed for any purpose desired. The dog or rocker-arm D is operated at the proper time to carry the die 17 downwardly upon or against a similar die 20, supported in a stationary block E, mounted upon the table A at the forward end of the machine. Said die 16 is adjustable vertically by means of an adjusting-screw $21^a$, (see Fig. 2,) and the said die 20 is similarly adjusted by means of a screw $21^b$, and it will be understood that said dies are correspondingly notched at 22 (see Fig. 5) by which to inclose and grip the wire when the forward end of the dog or rocker-arm is forced downwardly immediately preceding the heading of the wire or nail. The rearward end of the arm $p$ of the said double-acting rocker arm or dog D is provided on its under side with a plate 24, which is secured in place by means of screws 25, and the plate 24 is formed with a downwardly and outwardly inclined surface or lug 26 at the outer end thereof, while at a suitable point inwardly from said lug is also formed or provided a lug or projection 27. The two said lugs are so disposed relatively to each other and to the cam-lug 7 on the rearward end of the reciprocating yoke or frame $e$ that immediately preceding the contact of the heading-tool with the end of the wire to upset the latter the said cam-lug 7 rides beneath the said lug or projection 27, and thus the forward end of the said rocker arm or dog D, together with its die 17, is carried down upon the fed-in portion of the wire, which at this time is resting in the groove or notch in the upper surface of the stationary die 20 in block E. The gripping pressure thus exerted upon the wire prevents the latter from being forced backward against the force of the heading devices or mechanism, and as soon as the heading devices begin to recede or move backwardly, the said cam-lug 7 on the said reciprocating frame or yoke is carried from beneath the projection or lug 27, whereupon the free end of said arm drops by gravity to a position upon the upper surface of the machine. This of course elevates the die 17 and permits the wire to be again fed forward the extent of a nail length, as will hereinafter appear. The elevation of said die 17 should be rapidly effected, and therefore to assist the drop or fall of the outer end of arm $p$, when cam-lug is removed from beneath the same, I may employ a spring or other suitable device. (Not shown.) The continued return or backward movement of the yoke or frame $e$ of the heading devices causes the cam-lug 7 to also ride against the inclined surface of the lug 26, and by the time the said yoke or frame has reached the limit of such return movement the free end of arm $p$ of dog D is again elevated or lifted, so as to carry the die 17 downwardly, as before. During the return movement of the heading devices the wire has been fed in a nail length, and this second depression of die 17 is for the purpose of again gripping and holding the wire steady while the nail is being cut therefrom and pointed. The operation of the cutting and shaping dies for the nail takes place immediately succeeding the second gripping of the wire between the dies 17 and 20, as will be hereinafter explained. Now on the next return forward movement of the heading devices or mechanism the cam-lug 7 passes from beneath the lug 26, whereupon the free end of the rocking arm or dog again drops temporarily, as before, and after which the operation just described is repeated over and over again in the successive formation of the nails.

The cutting and pointing or shaping devices for the nails comprise two horizontally-disposed curved arms or levers G G, each of which is fulcrumed or pivoted near its forward end upon a suitable post or pillar 30, mounted or secured in place upon the bed-plate $a$ at near the forward end of the latter. Said curved arms or levers G G are enlarged and provided with suitable openings to receive the said posts or pillars, and surrounding the latter, intermediate the walls of the openings in the levers, are suitable wear-rings or box-bearings 31, and suitable adjusting-screws $32^a$ pass through openings in the sides of said levers at their bearings and bear upon said wear-rings or box-bearings. The said curved arms or levers are operated to bring the ends of their shorter and forward arms nearer together and farther apart at intermittent predetermined periods of time, and at their forward ends said arms or levers are each formed with a recess 32, in which is located a cutting and shaping die 33 for the inner end of the nail. Said dies are each provided with a backing-plate or support 34 intermediate the same and the base of its recess 32, said base being inclined from its outer edge inwardly and forwardly of the machine. Each of the said backing-plates or supports 34 is flat on its outer side corresponding to the similarly-flattened inner faces of the dies 33, while the inner faces of said backing-plates or supports are inclined to correspond with the said inclined surfaces of the said back walls or bases of the said recesses 32. Thus is formed a wedge-shaped backing for each die, which is adjustable by means of screws 35, passing through the outer side or wall of said recess, so as to allow the dies to be adjusted bodily either outwardly or inwardly relatively to the ends of the arms or levers G G. The said dies 33 are also adjustable toward or away from each other by means of similar screws 36, also passing through the outer side or wall of each of the said recesses 32. The longer members of the arms or levers G G are spread apart more widely and they extend for a suitable distance rearwardly of the machine, and at their ends or extremities they are each movably connected with one end of a link 39, the outer or inner end of which is also in swinging or movable connection with the longitudinally-reciprocating yoke or frame $e$ at or near the rearward or outer end of the latter. Each of the movable connections between the levers and yoke or frame $e$ is had by means of vertical pins or pivots 40, partially received in semicircular bearing-recesses 41, formed in the ends of the links, while cap-pieces or bearing-plates 42 are fitted to the ends of the links about the said pins 40, the cap-piece of each link being secured in place by means of metallic straps 43, passing about the link from end to end and screw-threaded at its own ends to receive fastening-nuts 44 thereon. This laterally-described construction and arrangement are simply preferred in practice; but I am not limited thereto, as will be understood. The cutting-dies 33 are formed with corresponding tapering notches, which when the dies are moved together on opposite sides of the wire to cut the latter serve to impart to the nail a pointed end. As shown in Fig. 1, the curved arms or levers G G have been operated from the movable yoke or frame $e$ to separate the cutting and shaping dies, while the heading-tool is operating upon the end of the wire to upset the same. In Fig. 3 the said curved arms or levers are shown as having been moved by the connecting-links 39 to close or bring the cutting and shaping dies together in operative or working relation.

The feeding mechanism for the wire will now be described.

The bed-plate $a$ is prolonged or extended somewhat at the forward end of the machine, so as to provide a suitable support for the ordinary straightening-rolls 50 for the wire, and intermediate said rolls and the point of operation of the gripping-dies is arranged the feed device proper, a sufficient space being left for the full and perfect operation of the same. Said device (see Figs. 2, 11, 12, and 13) consists principally of a guide 60, secured to a swinging arm 61 by means of screws or other suitable means 62, the said arm being arranged in a plane about centrally of the machine transversely thereof, as shown, and being bent or turned outwardly at $62^a$, so as to bring the upper end thereof in position to be pivotally attached at 63 to the upper end of a standard or upright $63^a$, which is attached to the machine in permanent vertical position in any desired manner. Movably connecting with said arm 61 at 64 is the forward end of a connecting-rod 65, the rearward end of which is also movably connected at 66 with the upper end of a lever 67, which is pivotally mounted at its lower end at any suitable stationary point 68 of the machine. Said lever 67 is mounted in such relation to a cam or tappet 69 carried on the main operating-shaft as to be operated at the proper predetermined time to draw upon the connecting-rod 65, and thus swing the arm 61 inwardly, whereupon as the said cam passes the said lever a suitable operating-spring 70, bearing against the lever in a contrary direction, will reversely operate the connecting-rod 65 to carry the said arm 61 back or outwardly again. These operations take place very quickly, and they are of course timed with reference to the operation of the other different mechanisms of the machine, and it will thus be seen that the guide 60 of the feed device proper has imparted thereto a reciprocating movement through the medium of the said swinging arm 61. The said reciprocating guide 60 is formed in its upper surface with an open-ended channel or recess 72, the side wall 73 of which is straight and parallel with the direction of feed of the wire, while the opposite side wall of said channel or recess is beveled or inclined at 74, so as to bring the narrowest portion of the wedge-shaped recess at the outermost end of said guide 60. Seated in a groove in the wall 73 of said recess is a metal block or plate 76, in which is formed a longitudinal groove 77, through which the wire passes, the depth of said groove being made either equal to or slightly less than the diameter of the wire, either as may be preferred. Formed in the side wall 74 of the channel or recess 72 is a slot or deep notch 78, which is closed at its inner end and open at its outer end, and seated or located in said recess 72 is a block or wedge J, having a straight side 80 and a beveled or inclined side 81, corresponding to the said straight and inclined walls of the recess. The said wedge J is slightly less in width at all points than the width of the recess at corresponding points, so as to properly accommodate the wire, and the wedge is loose in the recess, so as to have independent movement therein. Formed in the block or wedge J transversely thereof is an opening 82, through which passes a gripping device 83 for the wire, said device being preferably chisel-shaped on its inner end at 84, while the outer end 85 thereof rests and moves in the notch or slot 78 of the said inclined wall 74 of the channel or recess 72, formed in the upper surface of the said reciprocating guide 60, as already explained. Secured to the said guide 60 at 87 is preferably a flat spring 88, which exerts a constant pressure against the wider end or extremity of the said independently-movable block or wedge J, and working through the top of said block or wedge is a set-screw 89 for adjusting the before-mentioned chisel-pointed gripping device 83. Located on the machine at a suitable point is a stop or abutment 90, having a slot 91, by means of which the same is adjustable on a screw 92, said plate or abutment having an arm 93 projecting in the path of movement of the wedge. The feeding mechanism being thus constructed and arranged, the operation is substantially as follows: Assuming the swinging arm 61 to have been carried inwardly or toward the machine by the connecting-rod 65, it will be understood that a length of wire equal to the intended length of nail has been fed forward. Now as the reciprocating guide 60 starts to again move outwardly with the swinging arm 61 the wire itself causes the said block or wedge J to slip in the recess 72 of the guide sufficiently to release engagement of the gripping device 83 from said wire, whereupon as the guide and wedge are continued to be carried outwardly the said gripping device 83 passes freely along the wire without impediment to the proper outward movement of the said wedge and guide. During this action a small portion of the outermost end of the said block or wedge projects beyond the corresponding end of said recess 72, and just before the guide 60 reaches the limit of its outward movement the said projecting end of the wedge is encountered by the arm 93 of the abutment or stop 90, which momentarily arrests the block or wedge, while the guide continues to the end of its limit, the said block or wedge itself remaining stationary, as it were, with respect to the said guide. Now this momentary arrestment of the block or wedge increases the pressure or tension of the spring 88 against the broader end of said block or wedge and then on the next return inward movement of guide 60 it first moves a slight distance independently of the wedge, which, of course, by the assistance given by the spring 88 causes the chisel-shaped gripping device 83 to again take or bite into the side of the wire, whereupon the wedge and its gripping device, the guide, and the wire itself all become rigidly connected together, as it were, momentarily, and then by the continued return movement of the parts the wire is again fed forward for the proper extent, as will be obvious. These movements all take place very rapidly at the proper periods of time, and it is evident that the feeding of the wire is thus most accurately and uniformly secured.

From the foregoing description, taken in connection with the accompanying drawings, it is thought the construction, arrangement, and mode of operation of my improved machine will be fully understood; but I repeat that I do not wish to be understood as limiting myself to the precise details herein referred to, since various immaterial changes in the structure can be made and still be within the scope of invention intended to be embraced.

Having thus fully described my invention, what I claim as new, and desire to secure by Letters Patent of the United States, is—

1. In a wire-nail machine, the combination of a feed mechanism, a heading mechanism, a combined cutting and pointing mechanism, a stationary die, and a double-acting device actuated by said heading mechanism and coöperating with said die to grip the wire pending the heading and cutting and pointing operations, substantially as described.

2. In a wire-nail machine, the combination of a feed mechanism, a reciprocating heading mechanism, a combined cutting and pointing mechanism, a stationary die, and a double-acting dog or rocker-arm actuated by said heading mechanism and coöperating with said die to grip the wire pending the heading and cutting and pointing operations, substantially as described.

3. In a wire-nail machine, the combination of a feed mechanism, a reciprocating heading mechanism, a combined cutting and pointing mechanism, a stationary die, and a double-acting device coöperating with said die and actuated by the heading mechanism on the forward movements thereof to grip the wire pending the heading operations, and similarly actuated by said heading mechanism on its return movements to grip the wire pending the cutting and pointing operations, substantially as described.

4. In a wire-nail machine, the combination of a feed mechanism, a reciprocating heading mechanism provided with a cam-lug, a combined cutting and pointing mechanism, a stationary die, and a double-acting device coöperating with said die and actuated by said cam-lug to intermittently grip the wire pending the heading and cutting and pointing operations, substantially as described.

5. In a wire-nail machine, the combination of a feed mechanism, a reciprocating heading mechanism provided with a cam-lug, a combined cutting and pointing mechanism, a stationary die, and a double-acting dog or rocker-arm provided with lugs or projections extending into the path of movement of said cam-lug, substantially as described.

6. In a wire-nail machine, the combination of a feed mechanism, a reciprocating heading mechanism provided with a cam-lug, a combined cutting and pointing mechanism, a stationary die, and a double-acting dog or rocker-arm coöperating at its forward end with said die and provided at its rearward end with projections extending into the path of said cam-lug, substantially as described.

7. In a wire-nail machine, the combination of a feed mechanism, a reciprocating heading mechanism provided with a cam-lug, a combined cutting and pointing mechanism, a stationary die, and a double-acting dog or rocker-arm, provided at its forward end with a die, and at its rearward end with projections extending into the path of movement of said cam-lug, substantially as described.

8. In a wire-nail machine, the combination of a feed mechanism, a reciprocating heading mechanism provided with a cam-lug, a combined cutting and pointing mechanism, a stationary die, and a rocker-arm or dog having at its forward end a coöperating die, and provided at its rearward end with a detachable plate having spaced projections extending into the path of movement of said cam-lug, substantially as described.

9. In a wire-nail machine, the combination of a feed mechanism, a reciprocating heading mechanism comprising a skeleton frame or yoke and an adjustable heading-tool, a combined cutting and pointing mechanism operating in a plane substantially at right angles to the plane of movement of said heading mechanism, a stationary die, and a double-acting rocker-arm or dog also having a die and actuated by the heading mechanism intermittently to grip the wire pending the heading and cutting and pointing operations, substantially as described.

10. In a wire-nail machine, the combination of a feed mechanism, a reciprocating heading mechanism, a combined cutting and pointing mechanism comprising pivoted curved levers provided on their shorter arms with coöperating dies, and having their longer arms normally spread apart, movable links connecting said longer arms with the heading mechanism, a stationary die, and a double-acting device coöperating with said die and actuated from said heading mechanism to intermittently grip the wire pending the heading and cutting and pointing operations, substantially as described.

11. In a wire-nail machine, a feed mechanism comprising a reciprocating guide, a device supported by said guide and having a limited movement independently thereof, said device having a transverse tool to grip the wire, a spring constantly pressing upon the device in one direction, and a stop or abutment for arresting the device at a point within the extreme outer movement of the guide, substantially as shown and for the purpose described.

12. In a wire-nail machine, a feed mechanism, comprising a reciprocating guide provided with a channel or recess having a straight side and an inclined side, a device located in said recess also having a corresponding straight and inclined side, said device having a tool to grip the wire, and also having limited movement independently of the guide, a spring pressing against said device outwardly, and an abutment for arresting the device before the guide reaches the limit of its outward movement, substantially as described.

13. In a wire-nail machine, a feed mechanism comprising a reciprocating guide formed with an open-ended recess having a straight side and an inclined side, a wedge located in said recess also having a straight side, said wedge having an adjustable device for gripping the wire, and also having a limited movement independently of said guide, a spring constantly pressing the wedge outwardly from one end thereof, and an abutment on the machine for engaging the wedge at its other end and arresting its movement at a point within the limit of the outward movement of the guide, substantially as described.

14. In a wire-nail machine, a feed mechanism comprising a reciprocating guide formed at its upper end with a horizontal open-ended recess having a straight side and an inclined side, said straight side having means partially receiving the wire, a wedge located in said recess also having a straight side and an inclined side, and having a device for engaging or gripping the wire, said wedge having a limited movement independently of the guide, a spring pressing the wedge outwardly, and an abutment on the machine for arresting the wedge at a point within the limit of the outward movement of said guide, substantially as described.

15. In a wire-nail machine, a feed mechanism comprising a reciprocating guide formed with a horizontal open-ended recess having a straight side and an inclined side, said straight side having means for receiving the wire lengthwise, and said inclined side having a notch or slot, a wedge located in said recess and having sides corresponding to the sides of the latter, and an adjustable tool for gripping the wire passing transversely through the wedge and extending into said notch or slot, said wedge having limited independent movement in said recess, a spring pressing the wedge outwardly, and an abutment for arresting the wedge just previous to the completion by the guide of its outward movement, substantially as described.

16. In a wire-nail machine, a feed mechanism comprising a reciprocating or swinging arm and means for operating the same intermittently, a guide carried by said arm and provided with an open-ended recess having a straight side and an inclined side, a wedge located in said recess also having a straight side and an inclined side, said recess provided with means on the straight side thereof for receiving the wire lengthwise, and said wedge having a limited movement independently of the guide, and provided with a sharpened tool for engaging the wire, means pressing outwardly upon the wedge at its inner end, and an abutment on the machine for arresting the wedge at a point within the limit of the outward movement of the guide, substantially as described.

In testimony whereof I affix my signature in presence of two witnesses.

CHARLES F. ROTH.

Witnesses:
EMORY H. BOGLEY,
OSGOOD H. DOWELL.